US006694213B2

(12) United States Patent
Claesson et al.

(10) Patent No.: US 6,694,213 B2
(45) Date of Patent: Feb. 17, 2004

(54) METHOD AND A DEVICE FOR VIBRATION CONTROL

(76) Inventors: Ingvar Claesson, Hallestadvagen 59, SE-240 10 Dalby (SE); Thomas Lago, c/o Larson Davis, a PCB Group Com, 1681 W 820 N, US Provo, UT (US) 84601-1341; Lars Hakansson, Norra Hagtornsgatan 10, SE-256 61 Helsingborg (SE)

( * ) Notice: Subject to any disclaimer, the term of this patent is extended or adjusted under 35 U.S.C. 154(b) by 0 days.

(21) Appl. No.: 09/838,172

(22) Filed: Apr. 20, 2001

(65) Prior Publication Data
US 2002/0036091 A1 Mar. 28, 2002

Related U.S. Application Data

(63) Continuation of application No. PCT/SE99/01885, filed on Oct. 19, 1999.

(30) Foreign Application Priority Data

Oct. 22, 1998 (SE) ............................................. 9803607

(51) Int. Cl.$^7$ ................................................ G06F 19/00
(52) U.S. Cl. ...................... 700/169; 700/159; 700/173; 409/143
(58) Field of Search ................................ 700/169, 159, 700/173–174; 82/904; 408/143, 141

(56) References Cited

U.S. PATENT DOCUMENTS

| 4,031,368 A | * | 6/1977 | Colding et al. ............. 700/173 |
| 4,409,659 A | | 10/1983 | Devine ........................ 700/174 |
| 4,724,524 A | * | 2/1988 | Thomas et al. ............. 700/175 |
| 4,741,230 A | * | 5/1988 | Bohner et al. ................ 82/1.2 |
| 4,849,668 A | | 7/1989 | Crawley et al. ............. 310/328 |
| 5,170,103 A | * | 12/1992 | Rouch et al. ............... 318/128 |
| 5,485,053 A | | 1/1996 | Baz ............................. 318/128 |
| 5,913,955 A | | 6/1999 | Redmond et al. |

FOREIGN PATENT DOCUMENTS

| EP | 0715092 A2 | 6/1996 |
| JP | 63180401 | 7/1988 |
| WO | WO9220482 | 11/1992 |

* cited by examiner

Primary Examiner—Leo Picard
Assistant Examiner—Kidest Bahta
(74) Attorney, Agent, or Firm—Birch, Stewart, Kolasch & Birch, LLP

(57) ABSTRACT

A device for vibration control in a machine for internal turning uses a cutting tool supported by a tool holder, and has a control unit, a vibration sensor connectible to the control unit, and an actuator connectible to the control unit. The actuator has an active element, which converts an A.C. voltage supplied by the control unit to the actuator into dimensional changes. The active element is adapted to be embedded in the body of the tool holder, and is adapted to be embedded in such a manner that the dimensional changes impart bending to the body of the tool holder. A method for vibration control in internal turning and a tool holder for internal turning are provided.

15 Claims, 3 Drawing Sheets

METHOD AND A DEVICE FOR VIBRATION CONTROL

This application is a Continuation of PCT International Application No. PCT/SE99/01885 filed on Oct. 19, 1999, which was published in English and which designated the United States and on which priority is claimed under 35 U.S.C. §120, the entire contents of which are hereby incorporated by reference.

FIELD OF THE INVENTION

The present invention relates to a method and a device for vibration control, and more specifically a method and a device for vibration control in internal turning, and a tool holder for vibration control in internal turning.

BACKGROUND ART

In internal turning, dynamic motion arises between the tool and the workpiece. The motion is largely due to the fact that the chip-forming process, i.e. the removal of the generally relatively hard material from the workpiece, results in dynamic excitation of the tool, especially the tool holder. The dynamic excitation results in a dynamic motion, in the form of, for instance, elastic bending or torsion, of the tool and the tool holder. The chip-forming process is largely stochastic and the excitation results in tool vibrations and noise. In addition to thus causing problems in the working environment, the dynamic motion also affects the evenness of the surface of the workpiece and the service life of the tool.

It is therefore important to reduce the dynamic motion as far as possible. It has been known for long that the vibration problem is closely connected with the dynamic stiffness in the construction of the machine and the material of the workpiece. It has therefore been possible to reduce the problem to some extent by designing the construction of the machine in a manner that increases the dynamic stiffness. Moreover, it has recently been possible to increase the dynamic stiffness of the tool itself and the tool holder by active methods for controlling the response of the tool. This means that active control of the tool vibrations is applied.

The active control comprises the introduction of secondary vibrations, or countervibrations, in the tool by means of a secondary source which is called actuator. The actuator is operated in such manner that the control vibrations interfere destructively with the tool vibrations.

In internal turning, the tool is affected by excitation forces in the cutting speed direction, i.e. the direction of rotation of the workpiece at the cutting edge of the tool, in the direction of feed, i.e. axially seen from the perspective of the workpiece, and in the radial direction, i.e. radially seen from the perspective of the workpiece. The radial direction thus is perpendicular to the cutting speed direction. There are no known solutions for reducing tool vibrations in internal turning. However, attempts have been made to solve the corresponding problem in external turning. The excitation forces in external turning correspond approximately to the excitation forces in internal turning, but there are essential differences in the response of the tool holders since their design differs.

U.S. Pat. No. 4,409,659 discloses an example of active control of the tool vibrations in external turning. An ultrasonic actuator is arranged on the tool and produces countervibrations in the tool. The operating current of the actuator is controlled according to physical parameters that are measured and by means of the work of the actuator are kept within defined limits. This construction is unwieldy since the actuator is a comparatively large component which must be mounted on a suitable surface of the tool. Moreover, the directive efficiency of an ultrasonic actuator is not quite distinct.

JP-63,180,401 discloses a very different solution in external turning, where the actuator is built into the tool holder which holds a turning insert. A laterally extending through hole, which is rectangular in cross-section is formed in the tool holder. A piezoelectric actuator, in series with a load detector, is fixed between the walls that define the hole in the longitudinal direction of the tool holder. The load detector detects the vibrations and is used by a control unit to generate, via the actuator, countervibrations which reduce the dynamic motion. This construction necessitates a considerable modification of the tool holder and indicates at the same time that the designer has not been aware of the essence of the excitation process. In fact, the modification counteracts the purpose of the construction by reducing the stiffness of the tool holder in the most important directions, above all vertically, which in itself causes a greater vibration problem, or alternatively means that the dimensions of the tool holder must be increased significantly in order to maintain the stiffness. During external turning, the rotating tool produces a downwardly directed force on the cutting edge. When the cutting edge offers resistance, material is broken away from the workpiece. In this context, most of the vibrations arise. In JP-63,180,401, one imagines that the surface of the workpiece is uneven (wave-like) and thus mainly excites the tool holder in its longitudinal direction. Via the actuator, one generates an oscillation in opposition towards the wave pattern and thus obtains a constant cutting depth.

There is thus a need for a solution which controls the most essential vibrations, which is intended for internal turning, or drilling turning, and which causes a minimum of negative effects, such as bulky projections of dynamically weakening modifications, and still has a good effect.

SUMMARY OF THE INVENTION

An object of the present invention is to provide a well-functioning method and a well-functioning device for vibration control in internal turning.

The object is achieved by a device and a method according to the present invention. Thus, there is provided a device for vibration control in a machine for internal turning, said machine comprising a cutting tool supported by a tool holder, the device comprising a control unit, a vibration sensor connectable to the control unit, and an actuator connectable to the control unit. The actuator comprises an active element, which converts an A.C. voltage supplied by the control unit to the actuator into dimensional changes, wherein said active element is adapted to be embedded in the body of the tool holder. The active element is adapted to be embedded in such manner that said dimensional changes impart bending to the body of the tool holder.

Further, there is provided a method for vibration control in internal turning, comprising the steps of detecting the vibrations of a tool holder during working, and generating control vibrations in the tool holder, according to the detected vibrations and by means of at least one active element which is electrically controllable to dimensional changes. The method comprises the further steps of embedding said active element in the body of the tool holder and, for generating the control vibrations, imparting bending to the body of the tool holder by generating at least one control voltage and applying the control voltage across said active element, Another object of the present invention is to provide a tool holder arranged for vibration control.

The object is achieved by a tool holder for internal turning, the tool holder comprising an actuator, said actuator comprising an active element which is electrically controllable to dimensional changes, wherein said active element is embedded in the body of the tool holder and is adapted to impart, through said dimensional changes, bending to the body of the tool holder.

The idea of embedding, according to the invention, at least one active element in the tool holder implies a minimal modification of the tool holder and at the same time uses the rapidity and the capability of changing dimensions of the active element in an optimal manner. The embedding is also advantageous by the device being useable in practice since it is protected against cutting fluids and chips. In addition to the prior-art devices not being designed for internal turning, they are designed in a manner which possibly makes them useable for laboratories, but not in the industry.

The device according to the invention is further adapted to impart bending to the tool holder through the arrangement of the active element/elements. The corresponding actuator element in JP-63,180,401 is deliberately arranged so that the dimensional change occurs along the longitudinal axis of the tool holder, which does not result in bending. This depends on an incomplete idea of what primarily causes the vibration problems. Thus one has not realised that the most important excitation forces have any other direction but parallel with the longitudinal axis of the tool holder. Even with this knowledge, the construction according to JP-63,180,401, however, is not easily adjustable to any other kind of mounting than the one shown.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention and additional advantages thereof will now be described in more detail by way of embodiments with reference to the accompanying drawings, which are given by way of illustration only, and thus are not limitative of the present invention, and in which.

DESCRIPTION OF EMBODIMENTS

Figure 1:
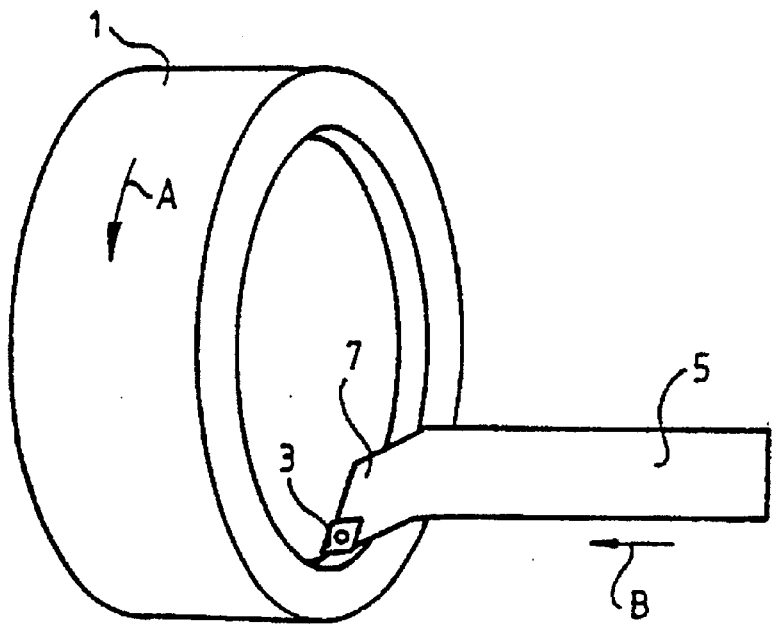
FIG. 1 is a schematic perspective view from of an arrangement of a workpiece and a tool holder with a mounted tool.
Figure 2:
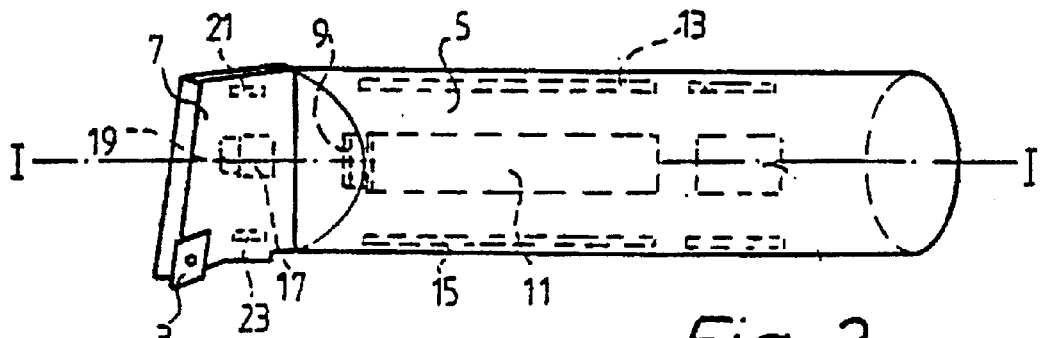
FIG. 2 is a schematic perspective view of an embodiment of the tool holder with a mounted tool according to the invention.
Figure 3:
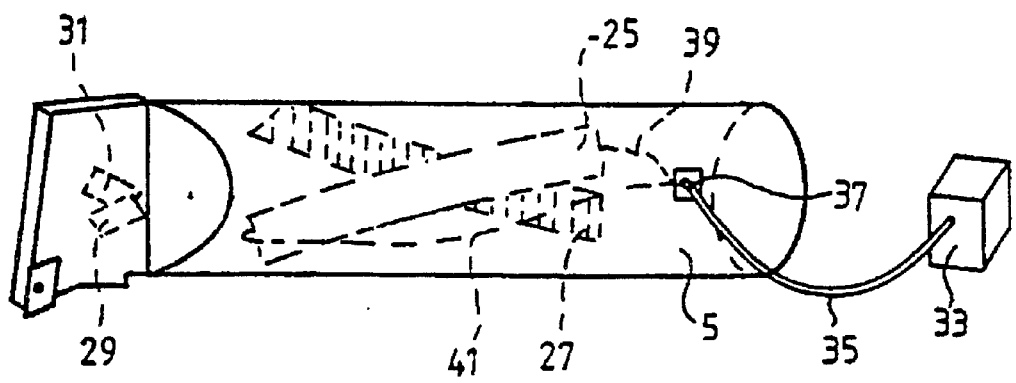
FIG. 3 is a schematic perspective view of another embodiment of the tool holder with a mounted tool according to the invention.
Figure 5:
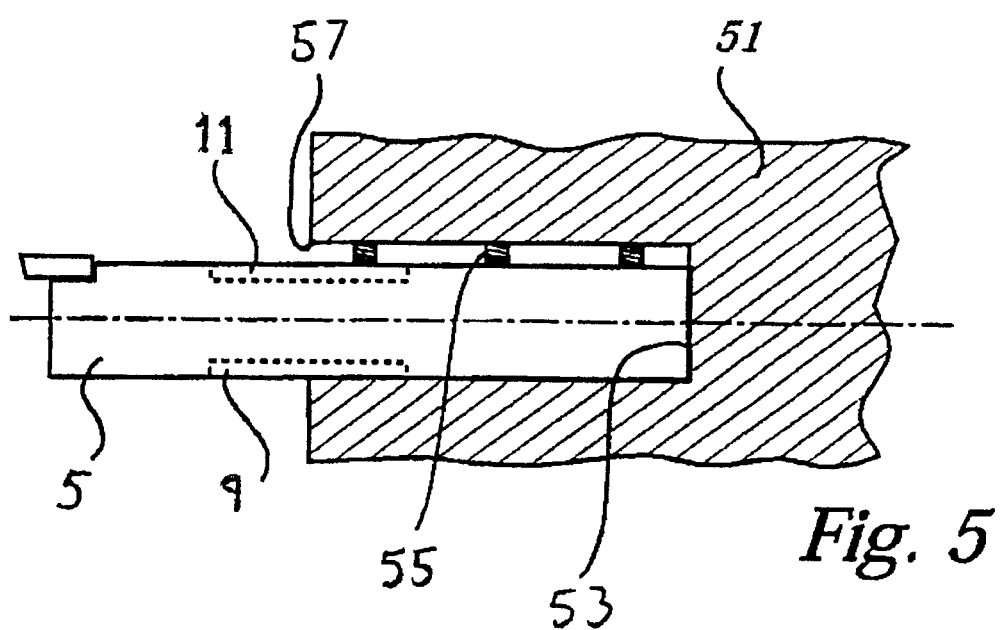
FIG. 5 is a schematic view of yet another embodiment of the tool holder according to the invention.

In internal turning, a workpiece 1 is arranged in the turning lathe and is made to rotate at a certain cutting speed. In FIG. 1 the direction of rotation is indicated by arrow A. A turning tool 3, referred to as insert, is essentially rigidly mounted on a tool holder 5, which is referred to as boring bar. To remove material from the workpiece 1, the boring bar 5 is moved in a direction of feed indicated by arrow B. 7 designates the head of the boring bar 5, the head tapering towards the front end. It is to be noted that the most schematical view of FIG. 1 shows the workpiece 1 in perspective but the boring bar 5 in a view from above, for reasons of simplicity. FIGS. 2 and 3 shows the boring bar in a perspective view taken from above, while the boring bar of FIG. 5 is shown in a side view and again even more schematic than in FIGS. 2 and 3.

An advantageous embodiment of the device according to the invention is shown in FIG. 3. It comprises a control unit 33, two actuators 25, 27 and two sensors or sensor elements 29, 31. The actuator 25, 27 comprise active elements, which here consist of piezoceramic elements. A piezoceramic element can in turn be designed as a unit or advantageously be made up as a so-called stack and/or of several partial elements. Thus, the element can be a solid body or a plurality of individual, but composed and interacting bodies. The active elements 25, 27 are characterised in that they change dimension when an electric voltage is applied across them. The dimensional change is related to the voltage. The active elements 25, 27 are embedded in, more specifically cast into, the body of the tool holder 5. The casting is carried out by forming for each active element 25, 27 a recess in the body of the tool holder 5, whereupon the active element 25, 27 is arranged therein and covered by casting. The active element 25, 27 is glued preferably to the bottom surface of the recess. The piezoceramic elements 25, 27 are embedded fairly close to the surface of the tool holder 5, i.e. close to the circumferential surface thereof.

The sensors 29, 31 consist of piezoelectric crystals which generate an electric voltage when subjected to forces. Also the sensors 29, 31 are preferably covered by casting in the same way as the active elements 25, 27. The control unit 33 is connected, via a conduit 35 containing a plurality of conductors, and a terminal 37 mounted on the boring bar 5, to the sensors 29, 31 and the actuators 25, 27. For the sake of clarity, only those conductors 39, 41 are shown in the boring bar 5 which are connected to the one actuator 25, but of course conductors are also arranged for the other actuator 27 and for the sensors 29, 31. The conductors 39, 41 are also cast into the tool holder 5.

The mainly dynamic forces acting on the boring bar have the character of torsion. The piezoceramic elements 25, 27 are plate-shaped and elongate. By arranging them in an inclined position as shown in FIG. 3, i.e. with their longitudinal direction helically extended round the centre axis of the boring bar 5, they are essentially parallel with the resultants of the torsional forces in the body of the boring bar 5. The sensors 29, 31 are arranged correspondingly in the head 7 of the boring bar.

In an alternative embodiment as shown in FIG. 2, use is made of four active elements 9, 11, 13, 15 and four sensors 17, 19, 21, 23, which are oppositely arranged in pairs and in parallel, in the form of two pairs of sensors 17, 19 and 21, 23, respectively, and two pairs of active elements 9, 11 and 13, 15, respectively. The active elements 9, 11 of the first pair are arranged in an upper and a lower portion, respectively, of the boring bar 5. The active elements 13, 15 of the second pair are arranged in opposing side portions of the boring bar 5. The sensors 17, 19, 21, 23 are arranged correspondingly in front of the active elements 9, 11, 13, 15 in the head 7 of the boring bar 5.

In FIG. 5 another advantageous embodiment is shown. The purpose of FIG. 5 is to disclose a desirable positioning of the active elements in relation to the engagement of the boring bar 5 in the machine, i.e. here the turning lathe. As shown most schematically in a cut away view in FIG. 5, the boring bar 5 is held in a mounting recess 53 of the machine 51, and, more specifically, for example in a foundation or rigid part thereof. For comparing purposes the boring bar 5 of FIG. 5 is corresponding with the boring bar 5 of FIG. 2 and corresponding referentials are used for the shown active elements 9 and 11 indicated with dashed lines. The mounting recess 53 is cylindrical like the boring bar 5. The boring bar 5 is rigidly mounted in the machine 51, which is symbolically shown with fastening screws 55. What is specific for this embodiment is that the active elements 9, 11 are positioned along the length of the boring bar 5 in such a way that they extend into the recess 53 when the boring bar 5 is properly mounted therein. Preferably about one half of each active element 9, 11 is placed inside of the recess 53 and the other half thereof is placed outside of the mouth 57 of the recess 53. This is due to location of the maximum of the bending as well as the strain energy of the boring bar 5. It can be shown that this maximum is located at the very mouth of the recess 53. Traditionally it has typically been assumed that the boring bar acts like a protrusion of the rigid foundation wherein it is fastened. However, in practise the forces acting upon the tip of the boring bar causes bending thereof also within the recess 53, which bending has to be taken into account. In order to obtain a maximum effect of the dimensional changes of the active elements 9, 11 they should be positioned like in FIG. 5.

The vibration control is carried out as follows. Owing to the rotation of the workpiece 1, the chip-breaking process causes a force which, seen from the perspective of the workpiece, is tangentially directed and which acts on the insert 3. Owing to the fact that the cutting edge is spaced from the centre axis of the boring bar 51 bending is generated, which shows itself as a torsional force in the boring bar 5. At the same time, the insert 3 and the boring bar 5 are exposed to forces which, seen from the perspective of the workpiece, are directed radially and axially, respectively, the axial force arising owing to the feeding in the direction of arrow B. The radially and axially directed forces cause bending. Because of the character of the chip-breaking process, said forces vary, and therefore the motions of the boring bar 5, which result from said forces, are perceived as mechanical vibrations. The vibrations occur in all directions, but the torsional vibrations are dominant.

In the embodiment in FIG. 3, the following applies. The vibrations of the boring bar 5, especially the head 7, are detected by means of the sensors 29, 31, which are subjected to alternating pulling and pressing forces. The piezoelectric sensors generate sensor signals in the form of A.C. voltages in response to the pulling and pressing forces. The control unit 23 detects the sensor signals and, in relation thereto, generates control signals in the form of control voltages, which the control unit supplies to the actuators 25, 27, more specifically to the ends of the piezoceramic elements 25, 27. The piezoceramic elements 25, 27 widen more or less in the longitudinal direction according to the frequencies and amplitudes of the control signals. The longitudinal changes of the piezoceramic elements 25, 27 impart, through the arrangement of the piezoceramic elements 25, 27, bending to the boring bar 5 which generate torsional forces in the body of the boring bar 5. The power transmission to the material of the body of the boring bar 5 occurs wholly or essentially via the power-transmitting surfaces of the piezoceramic elements 25, 27. The power-transmitting surfaces consist of the end faces of the piezoceramic elements 25, 27 at the ends thereof and abut directly against surfaces in the body of the boring bar 5. The power transmission functions well thanks to the fact that the piezoceramic elements 25, 27 in this embodiment are embedded in such manner that all their boundary surfaces abut directly against the material of the body of the boring bar 5. The control unit 33 serves to generate such control voltages that the torsional vibrations introduced by the piezoceramic elements 25, 27 are in opposition to the torsional vibrations generated in the turning operation, so that the resulting torsional vibrations of the boring bar 5 are reduced.

The embodiments illustrated in FIG. 2 and FIG. 5 functions in a manner similar to that of the embodiment illustrated in FIG. 3. The difference between the embodiments is the arrangement of the sensors and actuators. In the embodiment in FIG. 2, in the first place vibrations in the lateral direction of the boring bar 5 and up and down are counteracted. The control is carried out by the control unit 33 which is connected to all the sensors 17, 19, 21, 23 and the actuators 9, 11, 13, 15. In this embodiment, bending is imparted to the boring bar 5, which counteract the bending forces that are generated by the radially and axially directed excitation forces. In all embodiments, the piezoceramic elements 9, 11, 13, 15, 25, 27 are spaced from the centre axis I—I of the boring bar 5. The expression "spaced from the centre axis" relates generally to the fact that the centre axes of the piezoceramic elements 9, 11, 13, 15, 25, 27 do not coincide with the centre axis of the boring bar 5. If the centre axes should coincide, no bending would be obtained, but merely a pure longitudinal change of the boring bar 5.

The control unit 33 is selectable among many different types, such as analog, fed-back control unit, conventional PID regulator, adaptive regulator or some other control unit suitable in a current application. Preferably the control unit strives to control the vibrations towards an optimal state. The control can imply, for example, minimising of the vibrations in one or all directions, in which case the optimal state can be completely extinguished vibrations. A large number of known control algorithms are available. It is desirable to find the most efficient one for the application.

Figure 4:
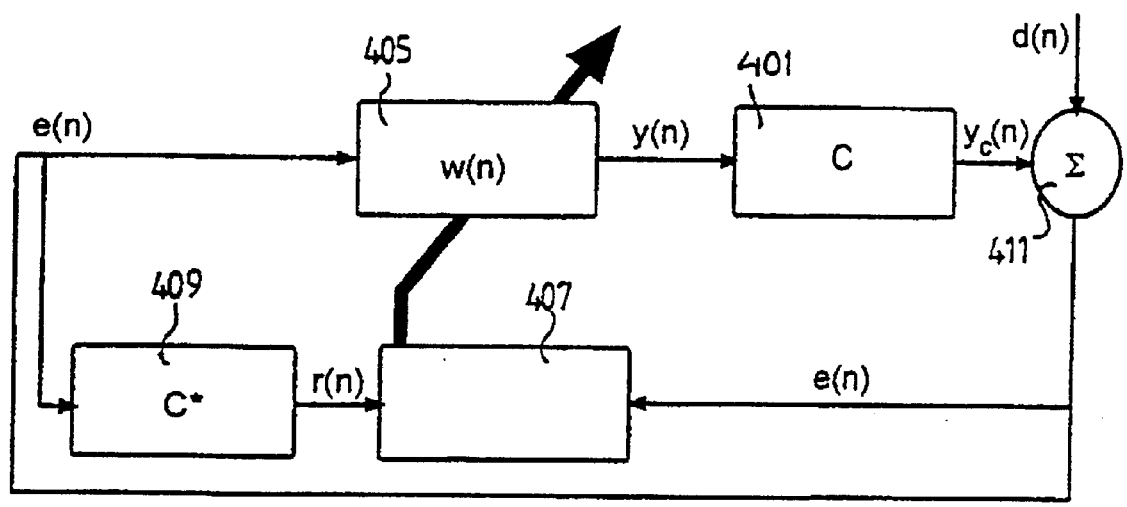
FIG. 4 is a block diagram of an embodiment of a fed-back control according to the invention.

A preferred embodiment of the control system constituted by control unit, sensors and piezoceramic elements, is fed back and based on a so-called "Filtered-X LMS-algorithm". It is true that this algorithm is per se known to those skilled in the art. FIG. 4 illustrates an equivalent block diagram of the fed-back control system in a digital description.

Block 401, which is also designated C, represents the dynamic system controlled, which contains actuators and sensors, for example the actuators 25, 27 and the sensors 29, 31. The other blocks represent an implementation of said algorithm. Block 405 represents an FIR filter with adjustable coefficients, block 407 represents an adaptive coefficient adjusting means, and block 409 represents a model (C*) of the dynamic system 401.

Seen from a functional, mathematic perspective, the dynamic system constitutes a forward filter, whose output signal, i.e. the response of the dynamic system, is $y_c(n)$. The coefficient adjusting means 407 strives to optimise the coefficients of the FIR filter so that an error signal e(n) is minimised. The error signal $e(n)=d(n)-y_c(n)$ where d(n) is a desirable output signal. The determination of the error signal is carried out by means of a summer 411. To ensure that the coefficient adjusting means converges each time independently of its initial state, it is supplied with a reference signal r(n) from the model 409 of the front filter.

An equivalent description of the control system can be made for all embodiments.

In mathematical terms it is possible to describe the effect of the invention by saying that it changes the transmission of the tool holder and, more specifically, changes the properties of one or more forward channels, each forward channel being associated with an excitation direction. This way of looking at the matter is equivalent to the effect of the invention being that control vibrations are generated, which influence the vibrations of the tool holder. It should thus be pointed out that in many cases the forward channel cannot be considered time-invariant, i.e. a traditional linear systems theory is in many cases not applicable. The system is usually non-linear.

Alternative Embodiments

The above specification constitutes but a non-limiting example of how the inventive device can be designed. Many modifications are feasible within the scope of the invention as defined in the appended claims. Below follow some examples of such modifications.

The above-described arrangements of the sensors and actuators are examples of arrangements and many variations are possible, such as a combination of those shown or other numbers of actuators, such as two pairs of actuators in each direction or a plurality of actuators adjacent to those shown. In its simplest embodiment, the inventive device comprises only one actuator which comprises one active element. This, however, results in a more non-linear control system, which causes unnecessary technical difficulties in controlling. Therefore it is an advantage to balance the system by arranging, like in the embodiments shown, the active elements in pairs opposite each other, i.e. opposite each other above and below the centre axis of the tool holder, such as the elements 9 and 11 in FIGS. 2 and 5, or the elements 25 and 27 in FIG. 3. A still greater linearity is achieved if each actuator is besides formed of two active elements which are joined, for instance by gluing, with each other into a double element. The double element will certainly be twice as thick as a single element, but gives a more dynamic effect, which sometimes is preferable.

Besides, the sensors can be of different types. In addition to those mentioned above, e.g. accelerometers and strain gauges are conceivable. The latter, however, are less suitable than the piezoelectric sensors from the environmental point of view.

For immediate and accurate detection of the vibrations, however, the above-described, embedded piezoelectric elements are preferable.

Also the active elements can be of different types within the scope of the invention. In the future, even thinner elements than those used today will probably be conceivable, for instance in the form of piezofilm (PZT). The currently preferred type, however, is piezoceramic elements.

The active elements are in respect of form not bound to be rectangularly parallelepipedal and plate-shaped as the elements shown, but the form may vary according to the application. The plate shape, however, is advantageous since it contributes to minimising the volume of the element. Moreover, an elongate form is a good property which also contributes to imparting to the element a small volume. It is preferred for the dimensional changes to occur in the longitudinal direction of the element.

The arrangement of the active elements in the tool holder may vary and certainly also affects the form. In addition to the above-described, preferred mounting where the elements certainly are glued to the base of the recess but two opposite power-transmitting surfaces essentially generate the bending, other alternatives are possible. One alternative implies that the dimensional change is fully transferred via the glue joint, which in principle is possible with today's strongest glues. Also other variants are contained within the scope of the invention.

The active element is covered by casting, using a suitable material. As an example, plastic materials can be mentioned. Preferably, however, a cover of metal is arranged on top and on the same level as the remaining tool holder surface.

The most common application of vibration control is to reduce the vibrations in all directions. However, this may not always be the case, at least for some of the directions. Occasionally the control can result in an actual increase of vibrations in a specific direction.

The design of the tool holder varies and may be, for example, T-shaped, the tool being arranged in one end of the crossbar of the T.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A tool holder for a machine for internal turning comprising:
    a substantially solid body with first and second opposed end portions, the first end portion having a cutting tool and the second end portion be fastenable to a machine; and
    at least one actuator having an active element adapted to undergo dimensional changes in response to an electric control signal, said active element being embedded in the body of the tool holder and due to dimensional changes of the active element, bending being imparted to the tool holder.

2. The tool holder as recited in claim 1, wherein the active element has a center axis which spaced from a center axis of the tool holder.

3. The tool holder as recited in claim 1, wherein the active element is embedded close to a surface of the tool holder.

4. A tool holder for a machine for internal turning comprising:
    a body with first and second opposed end portions, the first end portion having a cutting tool and the second end portion be fastenable to a machine, the body having at least one recess open to a peripheral surface thereof; and
    at least one actuator having an active element adapted to undergo dimensional changes in response to electric control signals, said active element being provided in the recess of the body of the tool holder and due to dimensional changes of the active element, bending being imparted to the tool holder, opposed end surfaces of the active element being in direct abutment against surfaces on the body of the tool holder.

5. The tool holder as recited in claim 4, wherein the active element is a piezoceramic element.

6. The tool holder as recited in claim 4, wherein the active element is a stack actuator.

7. A tool holder for a machine for internal turning comprising:
    a body with first and second opposed end portions, the first end portion having a cutting tool and the second end portion be fastenable to a machine, the body having at least one recess open to a peripheral surface thereof; and at least one actuator having an active element adapted to undergo dimensional changes in response to electric control signals, said active element being provided in the recess of the body of the tool holder and due to dimensional changes of the active element, bending being imparted to the tool holder, the active element being covered by a cast protective material.

8. The tool holder as recited in claim 7, wherein the active element is a piezoceramic element.

9. The tool holder as recited in claim 7, wherein the active element is a stack actuator.

10. A device for vibration control in a machine for internal turning comprising:

a cutting tool supported by a tool holder, said tool holder having a substantially solid body;

at least one vibration sensor provided on the tool holder for sensing vibrations therein;

a control unit receiving signals from the vibration sensor and producing a control signal; and at least one actuator having an active element, which converts the control signal received from the control unit into dimensional changes, said active element being embedded in the body of the tool holder and due to dimensional changes of the active element, bending being imparted to the tool holder.

11. The tool holder as recited in claim 10, wherein the active element is a piezoceramic element.

12. A device for vibration control in a machine for internal turning comprising:

a cutting tool supported by a tool holder, said tool holder having a body;

at least one vibration sensor provided on the tool holder for sensing vibrations therein;

a control unit receiving signals from the vibration sensor and producing control signals; and at least one actuator which converts the control signals into dimensional changes of the at least one actuator, said at least one actuator being provided for imparting bending to the body of the tool holder by being provided in a recess in the body of the tool holder with opposed end surfaces of the at least one actuator being in direct abutment against surfaces on the body of the tool holder.

13. A device for vibration control in a machine for internal turning comprising:

a cutting tool supported by a tool holder, said tool holder having a body;

at least one vibration sensor provided on the tool holder for sensing vibrations therein;

a control unit receiving signals from the vibration sensor and producing control signals; and at least one actuator which converts the control signals into dimensional changes of the at least one actuator, said at least one actuator being provided in a recess in the body of the tool holder and due to dimensional changes of the at least one actuator, bending being imparted to the tool holder, said at least one actuator being covered by a protective cast material.

14. A device for vibration control in a machine for internal turning comprising:

a cutting tool supported by a tool holder, said tool holder having a body;

at least one vibration sensor provided on the tool holder for sensing vibrations therein;

a control unit receiving signals from the vibration sensor and producing control signals; and at least one pair of actuators which converts the control signals into dimensional changes of the actuators, said actuators being fastened to the body of the tool holder and due to dimensional changes of the actuators, bending being imparted to the tool holder, said actuators being elongated and having longitudinal directions substantially parallel with a longitudinal direction of the tool holder and being diametrically spaced apart with one actuator being at an upper location of the tool holder and a second actuator being at a lower location of the tool holder.

15. A device for vibration control in a machine for internal turning comprising:

a cutting tool supported by a tool holder, said tool holder having a body;

at least one vibration sensor provided on the tool holder for sensing vibrations therein;

a control unit receiving signals from the vibration sensor and producing control signals; and at least one pair of actuators which converts the control signals into dimensional changes of the actuators, said actuators being elongated and diametrically spaced apart with their longitudinal directions being helically extended around a center axis of the tool holder.

* * * * *